United States Patent
Walkup

[11] Patent Number: 6,083,022
[45] Date of Patent: Jul. 4, 2000

[54] SYSTEM FOR CONNECTING DAUGHTER AND MOTHER BOARDS

[75] Inventor: William B. Walkup, Hillsboro, Oreg.

[73] Assignee: Hon Hai Precision Ind. Co., Ltd., Taipei Hsien, Taiwan

[21] Appl. No.: 09/165,056

[22] Filed: Oct. 2, 1998

Related U.S. Application Data

[60] Provisional application No. 60/062,070, Oct. 15, 1997.

[51] Int. Cl.⁷ ............................ H01R 13/15; H01R 24/00
[52] U.S. Cl. ................................ 439/260; 439/67
[58] Field of Search ................ 439/66, 67, 260, 439/630

[56] References Cited

U.S. PATENT DOCUMENTS

| | | | |
|---|---|---|---|
| 3,149,896 | 9/1964 | Hall | 439/495 |
| 4,738,625 | 4/1988 | Burton | 439/59 |
| 4,850,883 | 7/1989 | Kabadi | 439/67 |
| 5,489,218 | 2/1996 | McHugh | 439/342 |
| 5,653,598 | 8/1997 | Grabbe | 439/66 |

*Primary Examiner*—Neil Abrams

[57] ABSTRACT

A connector (10) for electrically connecting a daughter board (200) and a mother board (100) includes a base (12) securely mounted/riveted on the mother board (100) and a cover (26) horizontally slidably attached to the base (12) by means of a cam lever (18). A plurality of passageways (36) obliquely extend through the cover (26) for receiving therein a corresponding number of slanted contacts (38) wherein the bottom end (40) of each contact (38) projects out of the cover (26). The daughter board (200) is disposed under the cover (26) whereby the bottom end (40) of each contact (38) is mechanically and electrically engaged with a corresponding circuit pad (202) on the daughter board (200). The upper ends (42) of the contacts (38) are connected by soldier to one end of an FPC (300) (Flexible Printed Circuits) which is connected to the mother board (100) at the other end whereby the daughter board (200) can be electrically interconnected to the mother board (100) through the connector (10) and the associated FPC (300).

9 Claims, 6 Drawing Sheets

SYSTEM FOR CONNECTING DAUGHTER AND MOTHER BOARDS

This is a formal application to a provisional application No. 60/062,070 filed on Oct. 15, 1997.

BACKGROUND OF THE INVENTION

1. Field of the Invention

The invention relates to a system for connecting a daughter board to a mother board, and also particularly to a thin connector for use with such system.

2. The Related Art

As known, recently connectors used in the computer are required to be thinner and thinner for compliance with the miniaturization trend in this personal computer field. Another request from a computer manufacturer is to have a daughter board, on which a CPU is mounted, positioned above the mother board in a closely spaced parallel relationship therewith by means of a connection device for implementation of mechanical and electrical connection therebetween. Because the required distance between the spaced parallel daughter board and mother board is so small that it hardly positions a board-to-board connector with contacts therein, as shown in U.S. Pat. No. 5,653,598, between the daughter board and the mother board for interconnecting both boards with each other.

Therefore, an object of the invention is to provide a different type connection system for implementation of such interconnection under a required limited space/height.

SUMMARY OF THE INVENTION

According to an aspect of the invention, a connector for electrically connecting a daughter board and a mother board includes a base securely mounted/riveted on the mother board and a cover horizontally slidably attached to the base by means of a cam lever. A plurality of passageways obliquely extend through the cover for receiving therein a corresponding number of slanted contacts wherein the bottom end of each contact projects out of the cover. The daughter board is disposed under the base whereby the bottom end of each contact is mechanically and electrically engaged with a corresponding circuit pad on the daughter board. The upper ends of the contacts are connected to one end of an FPC (Flexible Printed Circuits) which is connected to the mother board at the other end whereby the daughter board can be electrically interconnected to the mother board through the connector and the associated FPC.

DETAILED DESCRIPTION OF THE PREFERRED EMBODIMENTS

Figure 1:
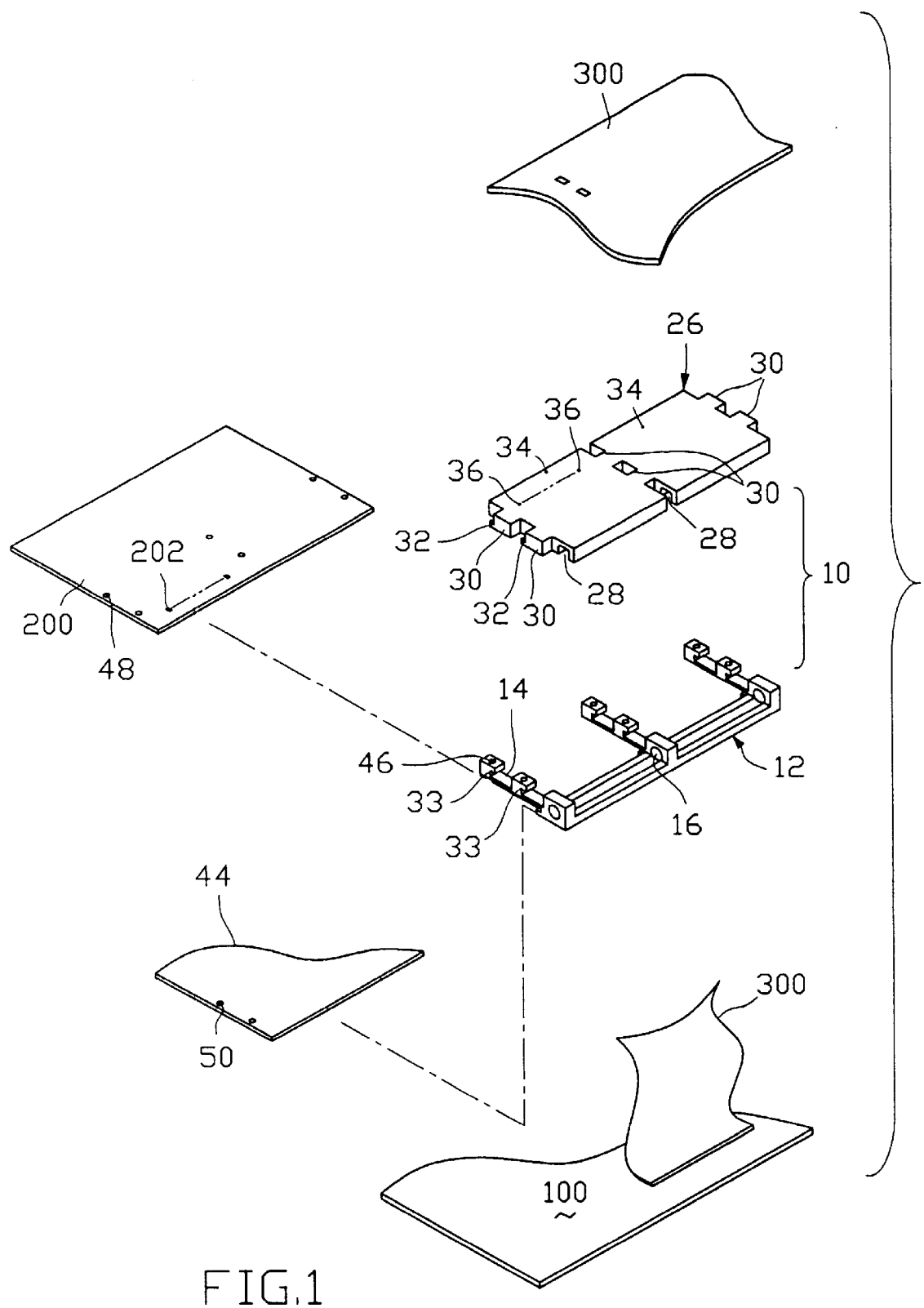
FIG. 1 is an exploded perspective view of a presently preferred embodiment of a system for combining a daughter board and a mother board through a connector and an FPC, according to the invention wherein the actuator and contacts are not shown therein.
Figure 2:
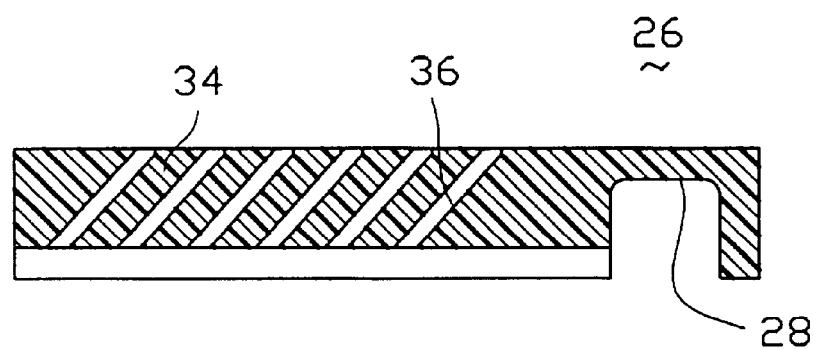
FIG. 2 is a cross-sectional view of the cover of the connector of FIG. 1 to show the oblique type passageways therein.
Figure 3:
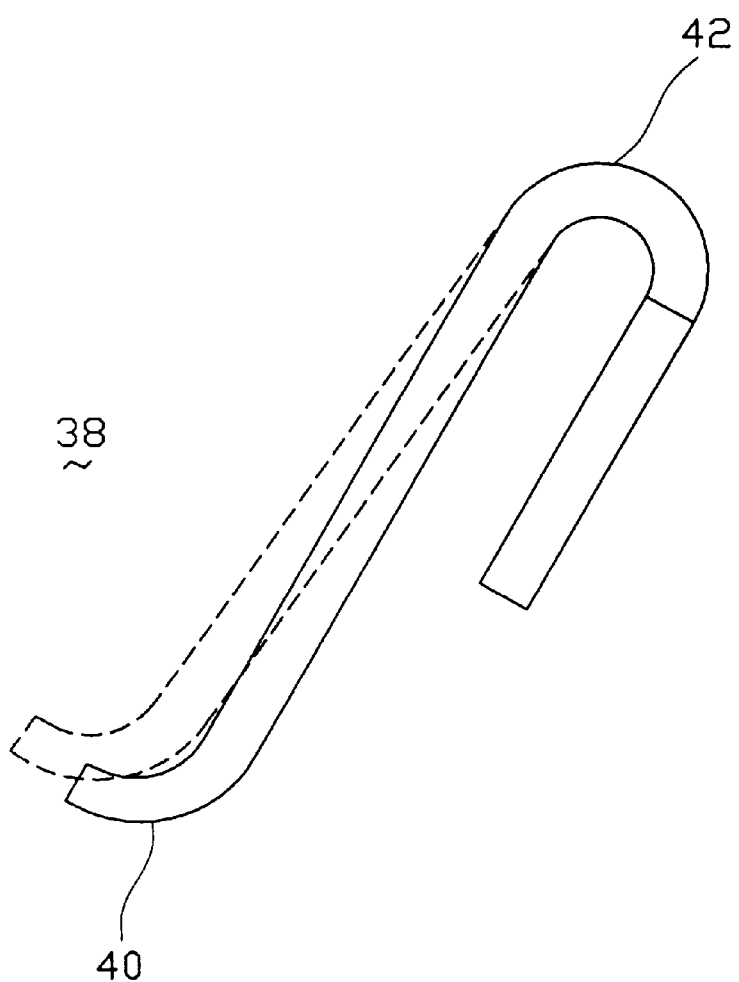
FIG. 3 is a side view of the contact for use within the cover of the connector of FIG. 1 with a deflected manner shown by dashed lines.
Figure 4:
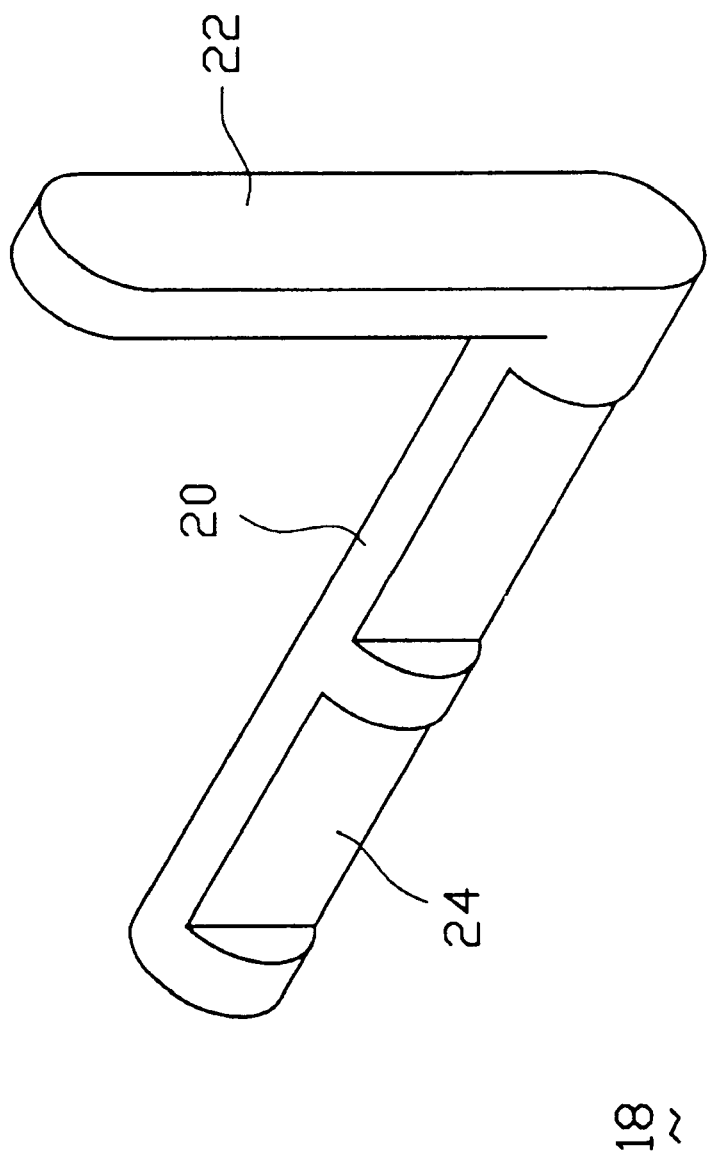
FIG. 4 is a perspective view of the actuator for use with the connector of FIG. 1.
Figure 5:
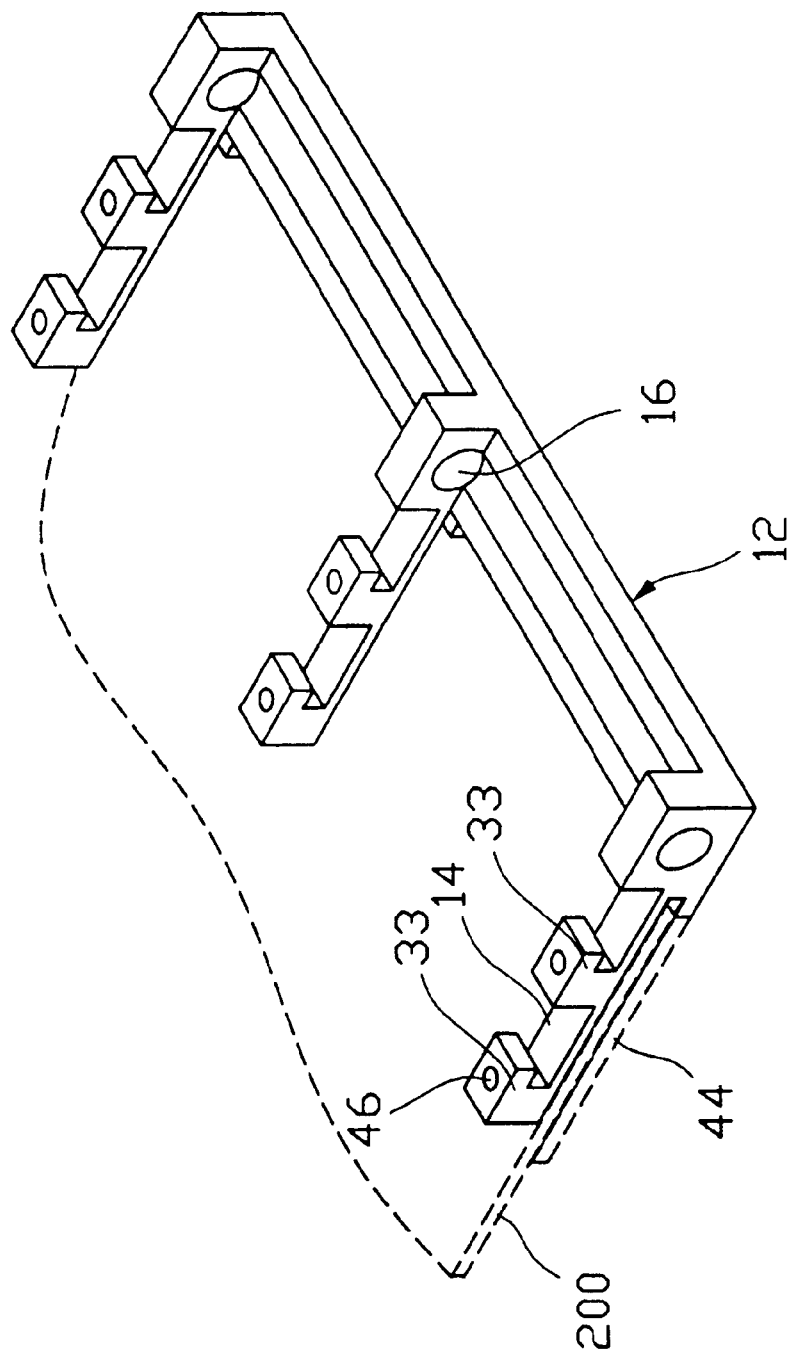
FIG. 5 is a perspective view of the base of the connector of FIG. 1 to show how the daughter board and the stiffening plate attached therebelow.
Figure 6:
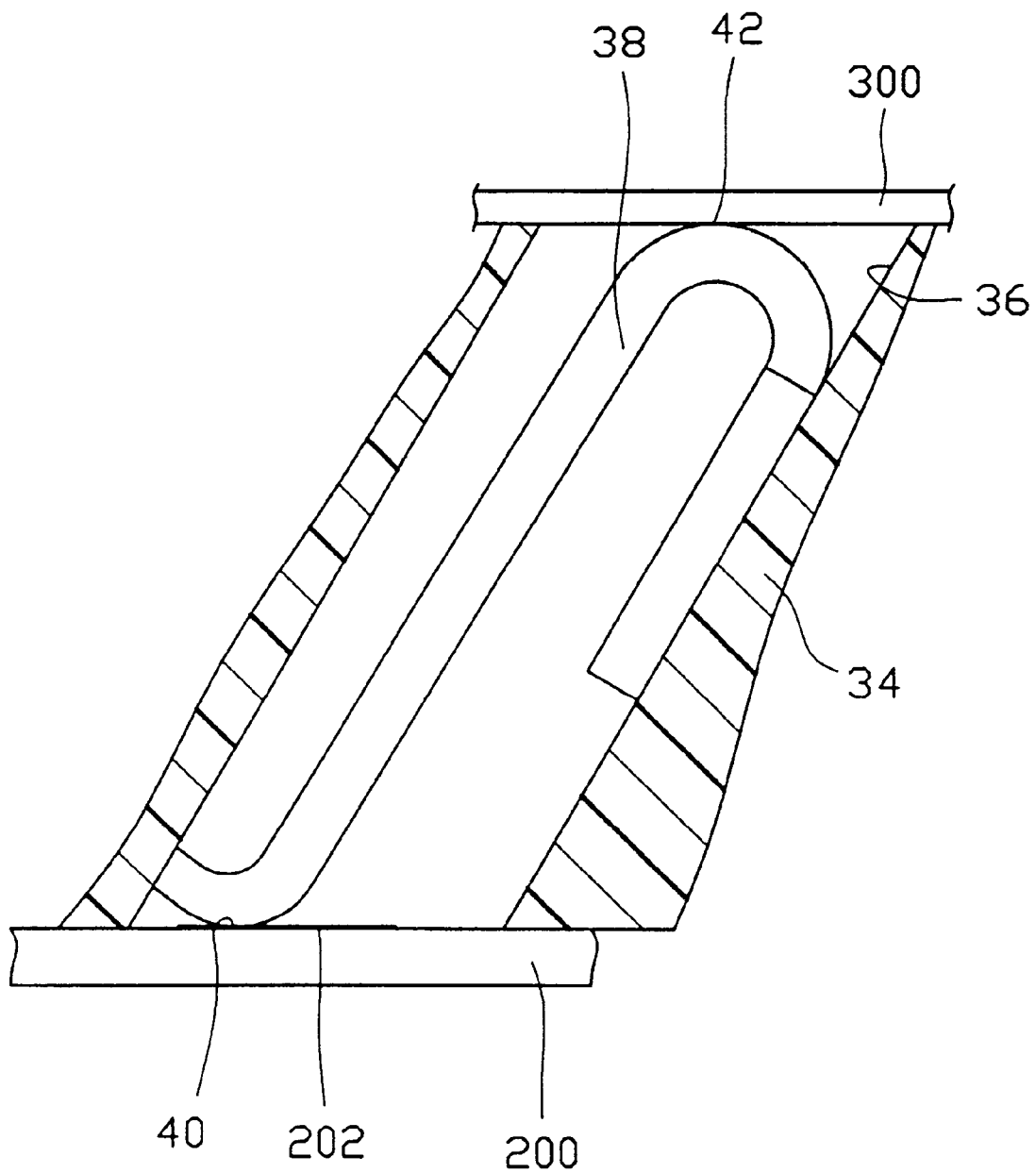
FIG. 6 is a cross-sectional view of the cover of the connector of FIG. 1 with the daughter board therebelow and the FPC thereabove.

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention.

It will be noted here that for a better understanding, most of like components are designated by like reference numerals throughout the various figures in the embodiment. Attention is directed to FIGS. 1–7 wherein a connector 10 includes a base 12 securely mounted to a mother board 100 wherein three arms 14 generally horizontally extend rearward from the base 12 while being spaced from the mother board 100 in a predetermined distance. Three bearing portions 16 are formed on the base 12 for cooperation with a cammed actuator 18 so that the shaft 20 of the actuator 18 can be supportably rotated within the bearing portions 16 by means of an operative handle 22 integral with the shaft 20. The shaft 20 further includes two cam sections 24 formed between every two adjacent bearing portions 16.

A cover 26 disposed on the top of the base 12, includes two shroud sections 28 in alignment with the corresponding cam sections 24 of the shaft 20 so as to be actuated to move back and forth by means of rotation of the handle 22 of the cammed actuator 18.

The cover 26 further includes three pairs of locking blocks with the locking tags 32 thereof, which can be moved along the corresponding arms 14 of the base 12 and are adapted to be latchably engaged with the corresponding latching lugs 33 formed on the arms 14 when the cover 26 is horizontally moved to the final rear engaging position with regard to the base 12. The relative structure relationship and the operation condition between the cover 26 and the base 12 are similar to the conventional ZIF PGA socket as disclosed in U.S. Pat. No. 5,489,218 which belongs to the same assignee of the present invention and is incorporated herein for reference.

The cover 26 further includes two main bodies 34 integrally formed with the corresponding shroud sections 28, respectively, and between every two adjacent pairs of locking blocks 30. The main body 34 is thicker than the locking block 30 and defines a plurality of passageways 36 extending through in a oblique manner for receiving a corresponding number of slanted type contacts 38 therein. The contact 38 retained within the corresponding passageway 36 includes a first lower end 40 protruding out of the bottom surface of the cover 26 for engagement with a corresponding circuit pad 202 of the daughter board 200, and a second upper end 42 adapted to be soldered to the corresponding circuit of an FPC 300 wherein such FPC 300 is connected to the mother board 100 at the other distal end.

Figure 7:
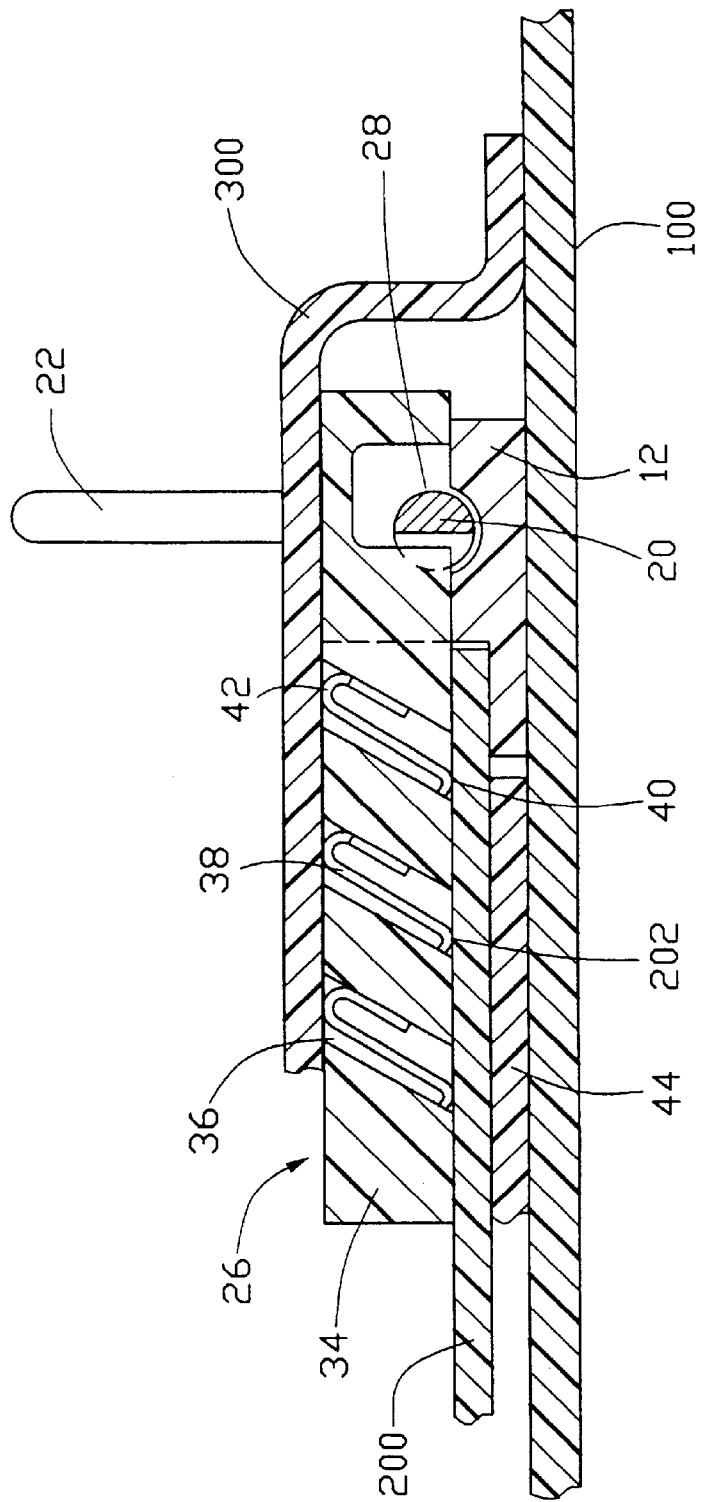
FIG. 7 is a schematic assembled view of the system of FIG. 1.

Particularly referring to FIG.7, the daughter board 200 is generally inserted into the space under the arms 14 and engaged with the contacts 38 of the connector 10. To enhance the strength of the daughter board 200, a stiffening plate 44 is supportably disposed under the daughter board 200, whereby several screws (not shown) can extend through the corresponding screw holes 46 in the arms 14, the holes 48 in the daughter board 200 and the holes 50 in the stiffening plate 44 for securely combining the daughter board 200 and the connector 10, and assure the mechanical and electrical engagement between the connector 10 and the daughter board 200.

One feature of the invention is the slanted type passageways 36 cooperating with the corresponding contacts 38 therein. The reason why the oblique type passageway 36 is adopted in the invention is due to limitation of the thickness dimension of the main body 34, thus resulting in insufficient space to produce the required spring force applied to the corresponding circuit pad 202 of the daughter board 200 if adoption of the conventional vertical type passageway in the traditional PGA, BGA or LGA socket. In the invention, the slanted type passageway 36 allows the corresponding contact 38 to bear the sufficient horizontal component of the force of the deflected contact 38 for reliable engagement with the corresponding circuit pad 202 on the daughter board 200. Understandably, this method can be also applied to the so-called board-to-board connector as disclosed the aforementioned U.S. Pat. No. 5,653,598.

Another feature of the invention is to provide a system or an arrangement for interconnection between a daughter board and a mother board wherein the daughter board is spaced from the mother board in a parallel relation with a very tiny distance which does not allow any connector/contact to be an interface therebetween. Therefore, the connector 10 of the invention is disposed on the daughter board 200 and the mother board, and interconnect both boards 100, 200 by means of its slanted type contacts 38 and an FPC 300.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

I claim:

1. A connector comprising:

a base adapted to be mounted to a mother board;

a cover slidably attached to the base;

a plurality of passageways obliquely extending through the cover; and a corresponding number of slanted contacts received within the passageways, respectively.

2. The connector as defined in claim 1, wherein each of said contacts includes a bottom end extending out of the cover.

3. A system for interconnecting a daughter board and a mother board, comprising:

a connector defining a plurality of contacts received within said passageways, respectively;

said connector defining a space for receiving an end portion of said daughter board under a condition that one end of each of said contacts mechanically and electrically engages a corresponding circuit pad of the daughter board which is neither received in nor supported by said connector; and an FPC including a first end connected to the connector under a condition that the other end of each of said contacts mechanically and electrically engages a corresponding circuit pad of the FPC.

4. The system as defined in claim 3, wherein the daughter board is positioned below the connector and the FPC is positioned on the connector.

5. The system as defined in claim 3, wherein said connector includes a base and a cover slidably attached to said base.

6. The system as defined in claim 5, wherein the passageways are defined in the cover so that the contacts may be slidable with regard to the daughter board when the cover is slidably moved with regard to the base.

7. An arrangement of interconnecting a mother board and a daughter board within a limited height, comprising:

a mother board;

a connector mounted to said mother board;

a plurality of contacts positioned within the connector;

a daughter board positioned within a space between the connector and the mother board; wherein said daughter board is not directly mechanically engaged with the mother board but is electrically connected to the mother board through the contacts of the connector.

8. The arrangement as defined in claim 7, wherein each of said contacts includes a bottom end engaged with the daughter board, and a top end electrically connected to the mother board through an FPC which is attached to the connector opposite to the daughter board.

9. An electrical assembly comprising:

a connector including a base and a cover adapted to be slidably moved with regard to the base;

a plurality of contacts positioned within the cover, a bottom end of each of said contacts extending downward out of the cover;

a daughter board positioned under the connector and fastened to the base; wherein the contacts of the connector can engage the corresponding circuit pads of the daughter board when the cover is actuated to slide on the base by a cam to an engagement position.

* * * * *